(12) United States Patent
Smith et al.

(10) Patent No.: US 6,408,347 B1
(45) Date of Patent: Jun. 18, 2002

(54) INTEGRATED MULTI-FUNCTION ADAPTERS USING STANDARD INTERFACES THROUGH SINGLE A ACCESS POINT

(75) Inventors: David John Smith, Cary; Frederick Kim Yu, deceased, late of Durham, both of NC (US), by Maria Rhodora Yu, legal representative

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/209,968

(22) Filed: Dec. 10, 1998

(51) Int. Cl.⁷ .......................... G06F 13/14; G06F 13/20
(52) U.S. Cl. .................... 710/36; 710/107; 710/302; 710/103; 713/1; 713/100; 370/465
(58) Field of Search ............................ 370/465; 710/36, 710/107, 302, 103; 713/1, 100

(56) References Cited

U.S. PATENT DOCUMENTS

| | | | |
|---|---|---|---|
| 3,832,575 A | 8/1974 | Dasgupta et al. | 307/208 |
| 4,240,139 A | 12/1980 | Fukuda et al. | 364/200 |
| 4,445,176 A | 4/1984 | Burk et al. | 364/200 |
| 4,445,213 A | 4/1984 | Baugh et al. | 370/94 |
| 4,495,572 A | 1/1985 | Bosen | 364/200 |
| 4,750,137 A | 6/1988 | Harper et al. | 364/514 |
| 4,797,815 A | 1/1989 | Moore | 364/200 |
| 4,837,679 A | 6/1989 | Wiles, Jr. et al. | 364/200 |
| 4,971,563 A | 11/1990 | Wells, III | 439/61 |
| 5,005,137 A | 4/1991 | Ernst | 364/514 |
| 5,010,514 A | 4/1991 | Kippenhan et al. | 364/900 |
| 5,097,148 A | 3/1992 | Gabara | 307/443 |
| 5,121,295 A | 6/1992 | Lam | 361/395 |
| 5,164,663 A | 11/1992 | Alcorn | 324/158 |
| 5,206,544 A | 4/1993 | Chen et al. | 307/443 |
| 5,218,680 A | 6/1993 | Farrell et al. | 395/325 |
| 5,227,677 A | 7/1993 | Furman | 307/443 |
| 5,247,616 A | 9/1993 | Berggren | 395/200 |
| 5,282,173 A | 1/1994 | Miyaji et al. | 365/230.03 |
| 5,296,756 A | 3/1994 | Patel et al. | 307/443 |
| 5,311,081 A | 5/1994 | Donaldson et al. | 307/475 |
| 5,311,408 A | 5/1994 | Ferchau et al. | 361/818 |
| 5,347,177 A | 9/1994 | Lipp | 307/443 |
| 5,394,546 A | 2/1995 | Hanatsuka | 395/600 |
| 5,463,326 A | 10/1995 | Raje | 326/30 |
| 5,467,254 A | 11/1995 | Brusati et al. | 361/799 |

(List continued on next page.)

FOREIGN PATENT DOCUMENTS

| | | | |
|---|---|---|---|
| EP | 317481 A2 | 5/1989 |
| EP | 317481 A3 | 5/1989 |
| EP | 365731 B1 | 5/1990 |
| EP | 365731 A1 | 5/1990 |

*Primary Examiner*—Jeffrey Gaffin
*Assistant Examiner*—Rehana Perveen
(74) *Attorney, Agent, or Firm*—Cesari and McKenn, LLP; A. Sidney Johnston

(57) ABSTRACT

Methods and systems are provided for communicating to multiple functions on a single adapter device over an external communications bus, where the external communications bus is configured so as to allow only a single access point to the external communications bus for each adapter device. Communications on the external communications bus are provided through the single access point to functions of a first type in the adapter device utilizing a function specific communications interface configured for communicating with functions of the first type. Communications on the external communications bus are also provided through the single access point to functions in the adapter device other than functions of the first type utilizing management capabilities of the function specific communications interface so as to provide communications with the functions of the second type without modifying the configuration of the function specific communications interface.

32 Claims, 5 Drawing Sheets

U.S. PATENT DOCUMENTS

| | | | |
|---|---|---|---|
| 5,478,259 A | 12/1995 | Noschese | 439/607 |
| 5,532,428 A | 7/1996 | Radloff et al. | 174/35 |
| 5,550,802 A | 8/1996 | Worsley et al. | 370/13 |
| 5,566,160 A | 10/1996 | Lo | 370/13 |
| 5,575,546 A | 11/1996 | Radloff | 312/183 |
| 5,579,210 A | 11/1996 | Ruhland et al. | 361/816 |
| 5,601,349 A | 2/1997 | Holt | 312/265.6 |
| 5,611,057 A | 3/1997 | Pecone et al. | 395/282 |
| 5,640,309 A | 6/1997 | Carney et al. | 361/801 |
| 5,654,873 A | 8/1997 | Smithson et al. | 361/685 |
| 5,694,291 A | 12/1997 | Feightner | 361/683 |
| 5,708,563 A | 1/1998 | Cranston, III et al. | 361/683 |
| 5,742,603 A | 4/1998 | Shafir et al. | 370/401 |
| 5,754,540 A | 5/1998 | Liu et al. | 370/315 |
| 5,757,618 A | 5/1998 | Lee | 361/686 |
| 5,774,343 A | 6/1998 | Benson et al. | 361/796 |
| 5,847,923 A | 12/1998 | Lee | 361/684 |
| 6,078,970 A * | 6/2000 | Nordstrom et al. | 710/19 |
| 6,101,557 A * | 8/2000 | Movall et al. | 710/2 |
| 6,163,824 A * | 12/2000 | Quackenbush et al. | 710/100 |
| 6,304,929 B1 * | 10/2001 | Wallach et al. | 710/103 |

* cited by examiner

INTEGRATED MULTI-FUNCTION ADAPTERS USING STANDARD INTERFACES THROUGH SINGLE A ACCESS POINT

FIELD OF THE INVENTION

The present invention relates generally to adapter devices and more particularly to adapter devices which are constrained in having a single access point to an external communications bus.

BACKGROUND OF THE INVENTION

In many interfaces used to interface adapter cards to other processors in network and data processing systems, the adapter card is limited to a single access point to the card. For example, in the Peripheral Component Interconnect (PCI) standard each adapter card is limited to a single media access controller (MAC) which interfaces to the PCI bus. An example of this single access point architecture is seen in FIG. 1 which illustrates a conventional system incorporating multiple network adapter cards.

As seen in FIG. 1, conventional network adapters 20, 20', such as Ethernet adapters, utilize a sing MAC 22 to communicate with a PCI connection 12 over the PCI bus 14. The MAC 22 may communicate with a single or multiple physical interfaces (PHYS) 24 over a media independent interface (MII) 23 which is an industry standard interface for communicating with a PHY. As is seen in FIG. 1, conventionally, the network adapter cards are limited to a single function type per card in that only PHYs are connected to the MAC 22 over the MII bus 23.

Conventionally, if functions other than a single function, such as a PHY, were desired, a MAC would access the PCI bus 14 on a separate card and then the separate card would be coupled to the adapter card. For example, switch ports and an Ethernet switch would conventionally be communicated with over an Ethernet connection. Alternatively, while the inventors are aware of any specific examples of such an adapter card, if multiple functions were desired on a single adapter, as seen in FIG. 2, conventionally, the PCI bus generally would be replicated on a single card 28 through the use of a PCI to PCI bridge 26 and then individual MACs 22 or other bridges 30 would be connected to the replicated PCI bus 14'. These MACs 22 and bridges 25 could then be used to access the multiple functions, such as the switch ports 32 and Ethernet switch 34 of FIG. 2. Thus, the single access point of the card could be maintained, however, the card's complexity would be greatly increased by the addition of the bridge to replicate the PCI bus, as well as the inclusion of separate MACs or bridges for each function. Such a system may be further complicated because separate device drivers would typically need to be written to interface to each replicated PCI bus interface on the card. Thus, for a two function card with two replicated PCI bus connections, two device drivers may be required.

In light of the complexity of adding functions to adapter cards where a single access point is required, a need exists for improvements in adapters which perform multiple functions but which are limited to a single access point to an external bus.

SUMMARY OF THE INVENTION

In view of the above discussion, it is an object of the present invention to provide for multiple functions in a single adapter.

A further object of the present invention is to provide multiple functions in a single adapter which does not require multiple device drivers.

Still another object of the present invention is to provide enhanced functions to network adapters which may be incorporated without modification to existing industry standard interfaces.

These and other objects of the present invention are provided by interfacing to the industry standard function specific bus, such as the MII bus utilizing management functions of the bus. The management functions are utilized to communicate with the enhanced features of the adapter card or to combine features on a single adapter without requiring replication of the external communications bus on the adapter. Such use of the management functions may be accomplished without changing the interface or operation of the interface to the primary functions of the adapter. Furthermore, because the functions are provided through the management features of the internal bus, a single device driver may be utilized for the adapter, thus reducing the complexity of programming for the adapter.

Thus, according to one embodiment of the present invention, an integrated network adapter device is provided with a media access controller (MAC) which provides a single point of access to an external communications bus. The external communications bus is configured so as to allow only a single medium access controller for an adapter device. A dedicated internal communications interface is configured so as to interface to circuits providing a network interface function so as to allow communications between network interfaces and the external communications bus through the single media access controller. At least one first circuit which provides a network interface function which communicates over the dedicated internal communications interface to communicate over the external communications bus is also provided. Furthermore, at least one second circuit which provides a function other than a network interface function and which is configured so as to communicate utilizing the dedicated internal communications interface to communicate over the external communications bus is also provided.

In further embodiments, the second circuit communicates over the dedicated internal communications interface to communicate over the external communications bus utilizing management functions of the dedicated internal communications interface. Furthermore, data portions of the management functions of the dedicated internal communications interface may be re-mapped to correspond to the function other than the network interface function. Thus, the present invention allows for the inclusion of the second function utilizing the dedicated internal interface without impacting the use of the interface by the first function.

Such a non-obtrusive incorporation of multiple functions may be accomplished by the second circuit being assigned an unused address of the dedicated internal communications interface. Communications between the external communications bus and the second circuit would then comprise management function communications to the unused address assigned to the second circuit.

In specific embodiments of the present invention, the media access controller comprises a Peripheral Component Interconnect (PCI) media access controller. The dedicated internal communications interface may be an Ethernet media independent interface (MII). Also, the first circuit may be a network physical interface (PHY). The second circuit may be a hardware address filter function. The first circuit may also be an Ethernet switch, where user traffic for ports of the Ethernet switch is communicated over the MII and where control of the Ethernet switch is provided over a bus other than the MII bus. Then, the second circuit may be an adapter for converting communications on the bus other than the MII bus to MII communications so as to allow control of the Ethernet switch from the PCI bus through the MAC.

In further embodiments of the present invention, methods and systems are provided for communicating to multiple functions on a single adapter device over an external communications bus, where the external communications bus is configured so as to allow only a single access point to the external communications bus for each adapter device. Communications on the external communications bus are provided through the single access point to functions of a first type in the adapter device utilizing a function specific communications interface configured for communicating with functions of the first type. Communications on the external communications bus are also provided through the single access point to functions in the adapter device other than functions of the first type utilizing management capabilities of the function specific communications interface so as to provide communications with the functions of the second type without modifying the configuration of the function specific communications interface.

In further embodiments of the methods and systems, functions in the adapter device other than functions of the first type are assigned an unused address of the function specific communications interface. Communications on the external communications bus through the single access point to functions in the adapter device other than functions of the first type are then provided by management function communications to the unused address assigned to the functions other than the first type.

In still another embodiment, data associated with management function communications with the functions other than the functions of the first type is re-mapped so as to provide function specific communications with the functions other than the function of the first type.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices.

The present invention can simplify the design and development of multiple function adapter cards based on existing designs of single function adapter cards by utilizing management functions of an industry standard internal communications interface to eliminate the need for a separate access point to the external bus for the additional functions. As used herein, "management functions" refers to capabilities or operations of an interface which are typically, although not exclusively, utilized to configure and monitor status of the single functions attached to the interface. Thus, a management function of the interface will typically support read and write operations, for example, to and from registers in the single functions. Furthermore, the management functions should allow for alteration of the data of management operations without affecting the configuration of the underlying industry standard bus. Typically, management functions are a subset of the total functions defined by an industry standard bus and thus, may provide a simplified mechanism for accessing additional functions. One example of management functions includes the Management Interface (MI) of the MII bus which is a serial interface which provides an interface to configure and extract status from a PHY. The MI provides read and write operations pursuant to the MII standard, however, the data may be changed in the read and write operations to allow for communications with function other than a PHY.

Furthermore, the additional functions may be accessed through the same device driver as was utilized for the single function card. As used herein, a "function" describes a circuit or other device on a card for carrying out specified actions. Thus, if a function is replicated on a card, then the actions carried out by that function are replicated on the card. For example, a four PHY network adapter card would have four instances of the single PHY function.

As used herein the term external communications bus refers to a communications bus which allows communications to devices external to the card. Thus, for example, the PCI bus would be an external communications bus.

Figure 1:
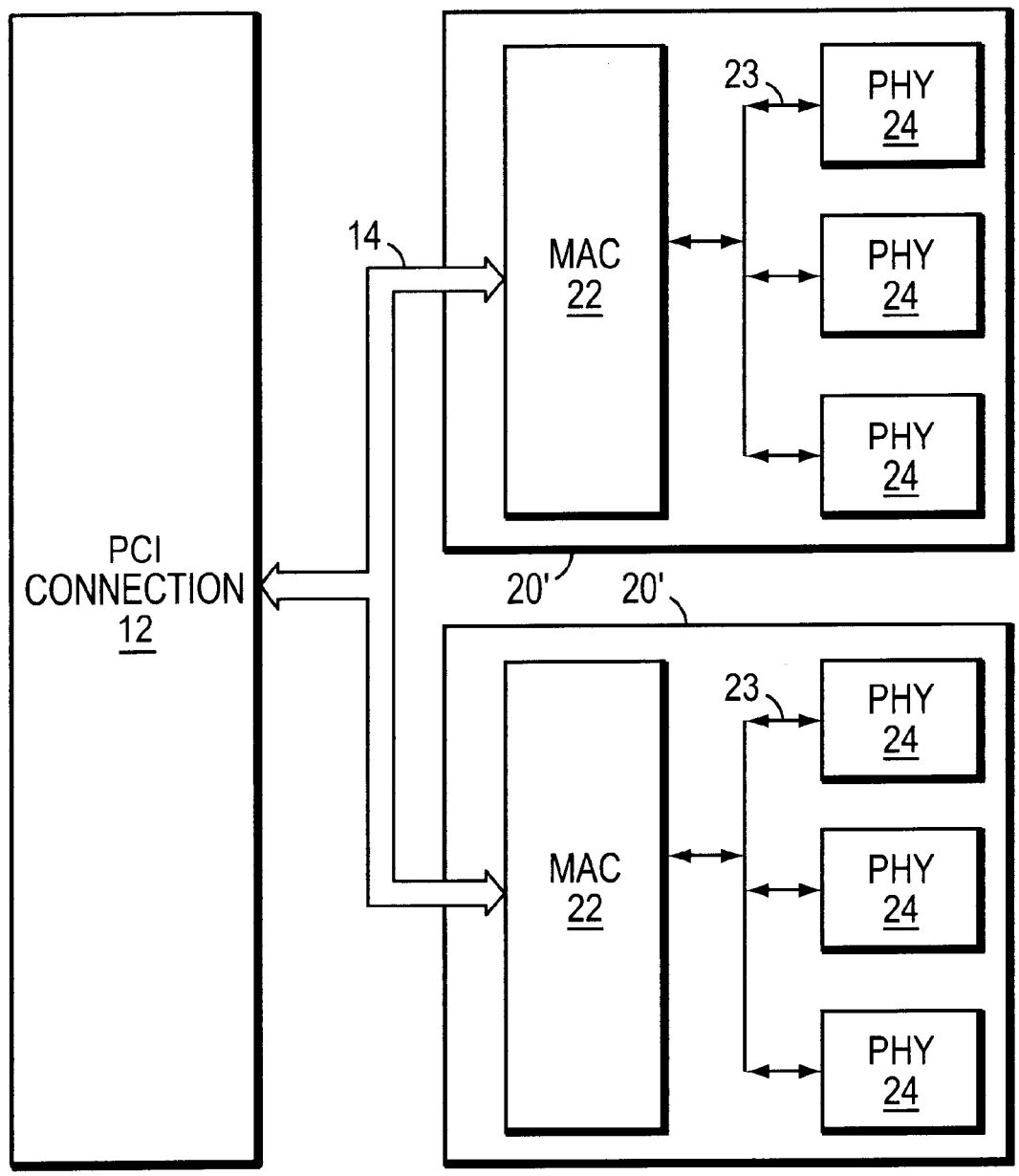
FIG. 1 is a block diagram of a conventional network adapter system with four PHY network adapters connected to a PCI bus.
Figure 2:
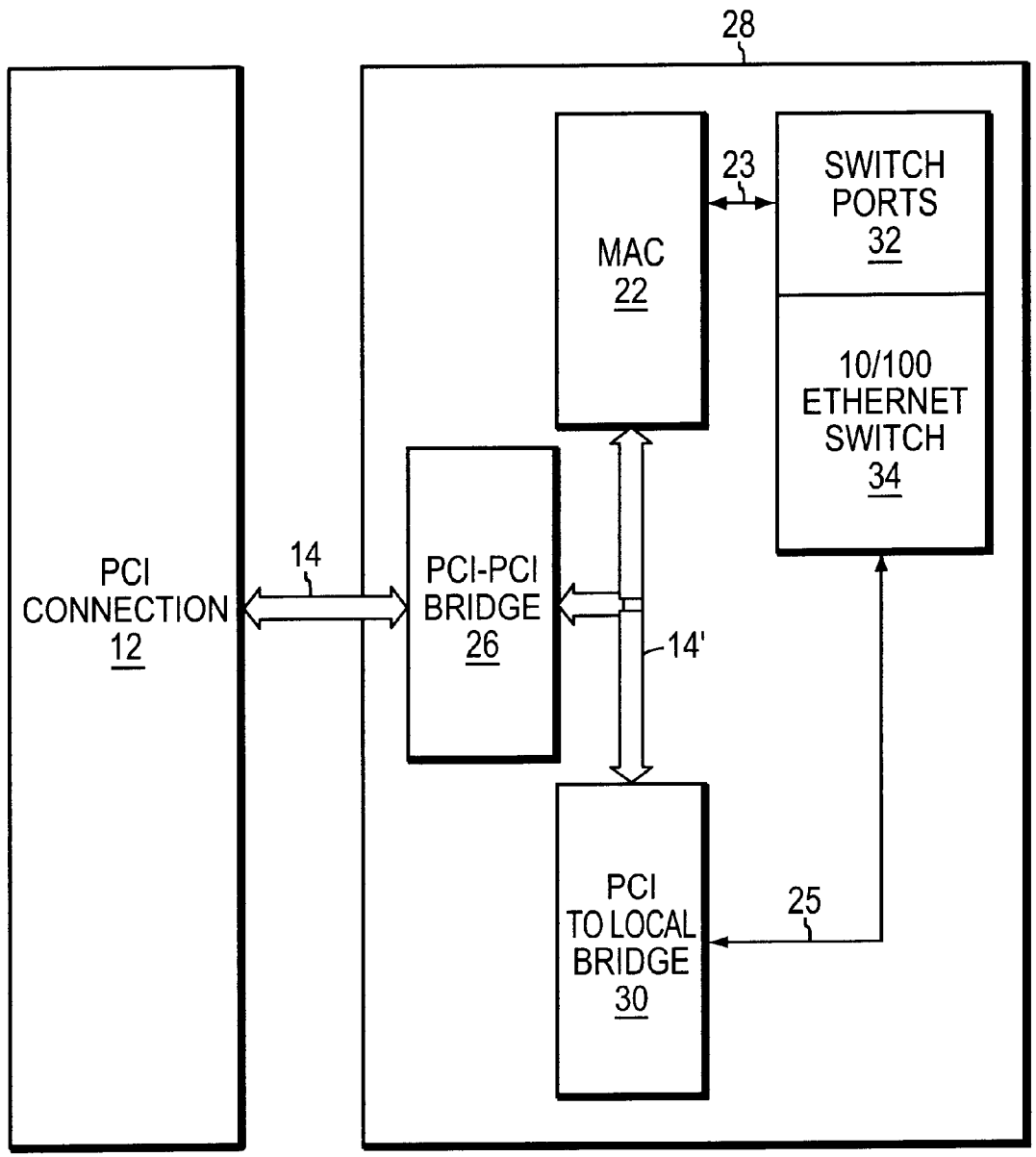
FIG. 2 is a block diagram of an Ethernet switch implementation which does not utilize the present invention.
Figure 3:
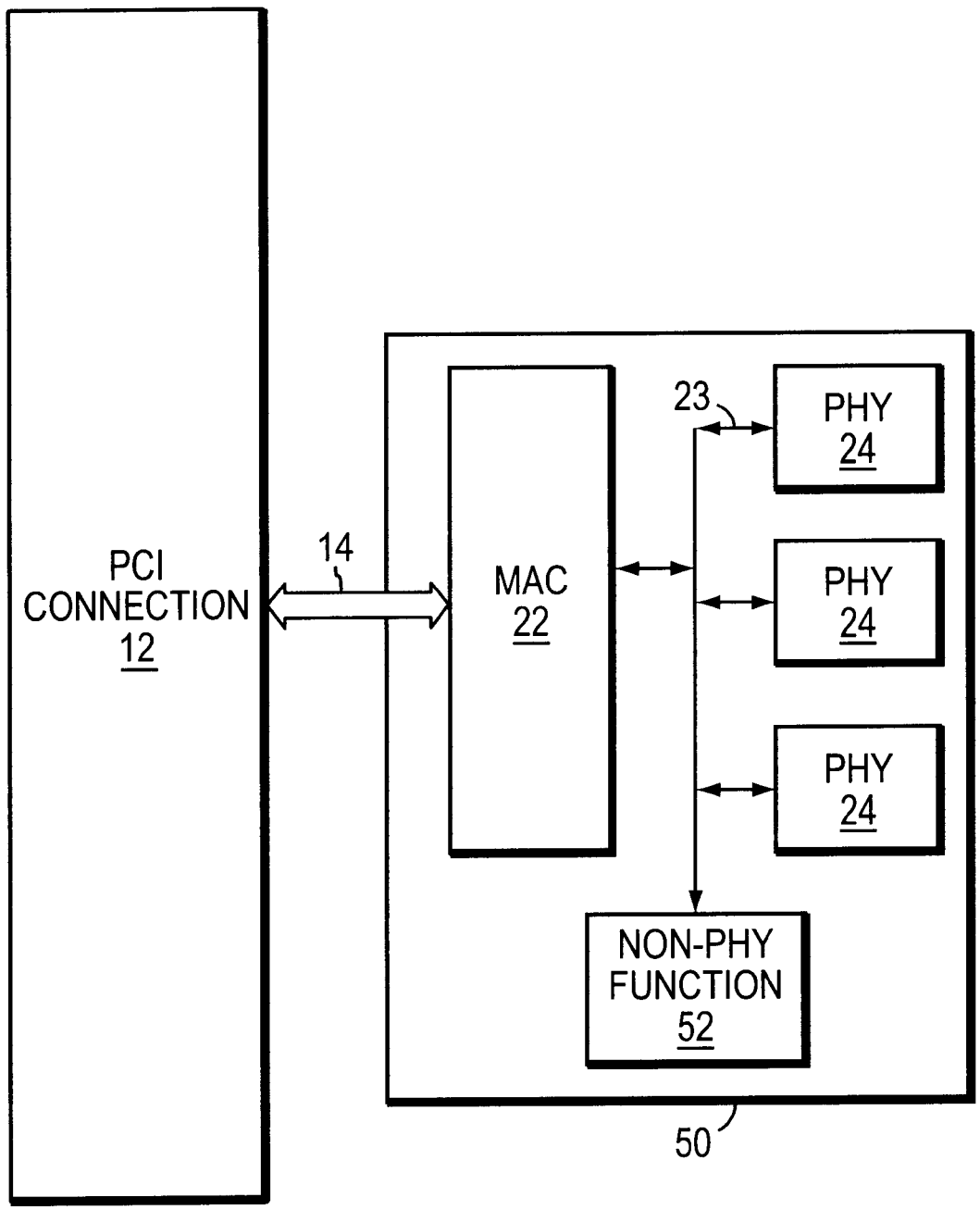
FIG. 3 is a block diagram of an enhanced function Ethernet adapter embodiment of the present invention.

FIG. 3 illustrates one example of an integrated multi-function adapter card 50 according to the present invention. The adapter card 50 in FIG. 3 is a multi-PHY network adapter. As seen in FIG. 3, the integrated multi-PHY adapter card utilizes a standard MAC 22 to interface over the PCI bus 14 to a PCI connection 12. The PHY functions 24 utilize an industry standard media independent interface (MII) bus 23 to communicate with the MAC 22. As is further seen in FIG. 3, a non-PHY function 52 has been added which also uses the internal MII bus 23 to access the external PCI bus 14 through MAC 22. Furthermore, the non-PHY function 52 may utilize only a portion of the MII bus 23, for example, the Management Interface (MI) portion of the MII bus 23 may be used to configure and otherwise communicate with the non-PHY function 52. Thus, the single access point to the PCI bus 14 is maintained while an additional function has been added.

For example, in the integrated adapter 50 of FIG. 3, the non-PHY function 52 may be a hardware address filter function. The hardware address filter function would monitor the MII bus 23 and reject frames which are not required to be forwarded on the PCI bus 14 for support of bridging applications. Periodic maintenance of the hardware address filter function is performed to initialize look-up tables and to properly flush them after a time period expires, such as after a timer expires. These maintenance operations utilize the MI of the MII 23.

As defined by the IEEE 802.3 standard, the MII bus 23 utilizes addresses to access the PHYs 24. Typically, however, not all of these addresses are required as 32 addresses are defined but, generally, less than 32 PHYs are present on a single adapter. Thus, the hardware address filter is assigned an unused address and then communicated with utilizing the management frame structure, for example, as defined by IEEE 802.3u Clause 22.2.4.4 (1995), to perform read and write operations to the hardware address filter. Furthermore, while the IEEE 802.3 standard defines the bit patterns of the data and status registers for the management of a PHY, this data may be re-mapped and used for other purposes by the non-PHY function 52.

Thus, while the operation may be a management frame write operation to a register of a PHY, because the address of the management function has been assigned to the non-PHY function 52 the information in the write operation may be utilized by the non-PHY function for its particular purpose. As an example, the control register bit definitions of IEEE 802.3u Clause 22.2.4.1 may be re-mapped to other functions for the non-PHY function 52 such as the hardware address filter, so that the bits could initialize or flush the look-up tables of the hardware address filter. While the non-PHY function 52 utilizes the management functions of the MII bus 23 to communicate with the external bus 14, the use of these management functions need not be constrained by the predefined definitions of the MII bus 23 except to the extent that those definitions define operations on the MII bus 23.

A further advantage of utilization of the management functions of the MII bus 23 is that the device driver which provides for communications with functions on the adapter 50 may require only minor modification to recognize operations which are to or from the non-PHY function 52 and act accordingly. Thus, because the read and write operations are the same for the PHY 24 and non-PHY functions 52 these operations may proceed in the same manner as if the operations were to or from a PHY 24. However, the device driver may be required to treat the data of the two operations differently.

Thus, for example, in the system illustrated in FIG. 3, an adapter with a hardware address filter may utilize the following addressing:

TABLE 1

MI Address Map

| Function | Physical Address | Register Address | Function | Read/Write (R/W) |
|---|---|---|---|---|
| National Semiconductor DP83840 PHY | 10001b | As specified by DP83840 data sheet | As specified by DP83840 data sheet | As specified by DP83840 data sheet |
| Hardware Address Filter | 00010b | 10000b | CMD cycle | R/W |
| | | 10001b | CMD w/COMPARE | R/W |
| | | 10010b | DATA cycle | R/W |
| | | 10011b | DATA w/COMPARE | R/W |
| | | 10100b | Liter CNTL | R |
| | | 10101b | Filter CNTH | R |
| | | 10110b | AGE TB Filter | W |
| | | 10111b | TB CNTRL | R/W |

In particular, the CMD cycle and the CMD w/COMPARE allow access of the command register of the hardware filter, the DATA cycle and the DATA w/COMPARE allow access to the data register of the hardware filter, the Filter CNTL allows access to the lower 16 bits of a counter indicating filtered frames, the Filter CNTH allows access to the higher 16 bits of the counter, writes to AGE TB Filter causes a time stamp to increment and age out stale entries in the filter and finally, TB CNTRL allows access to the control and status register of the filter. Thus, as is evident from the above table, the MI functions of the MII bus may be re-mapped to provide functions suitable for controlling the non-PHY function.

Figure 4:
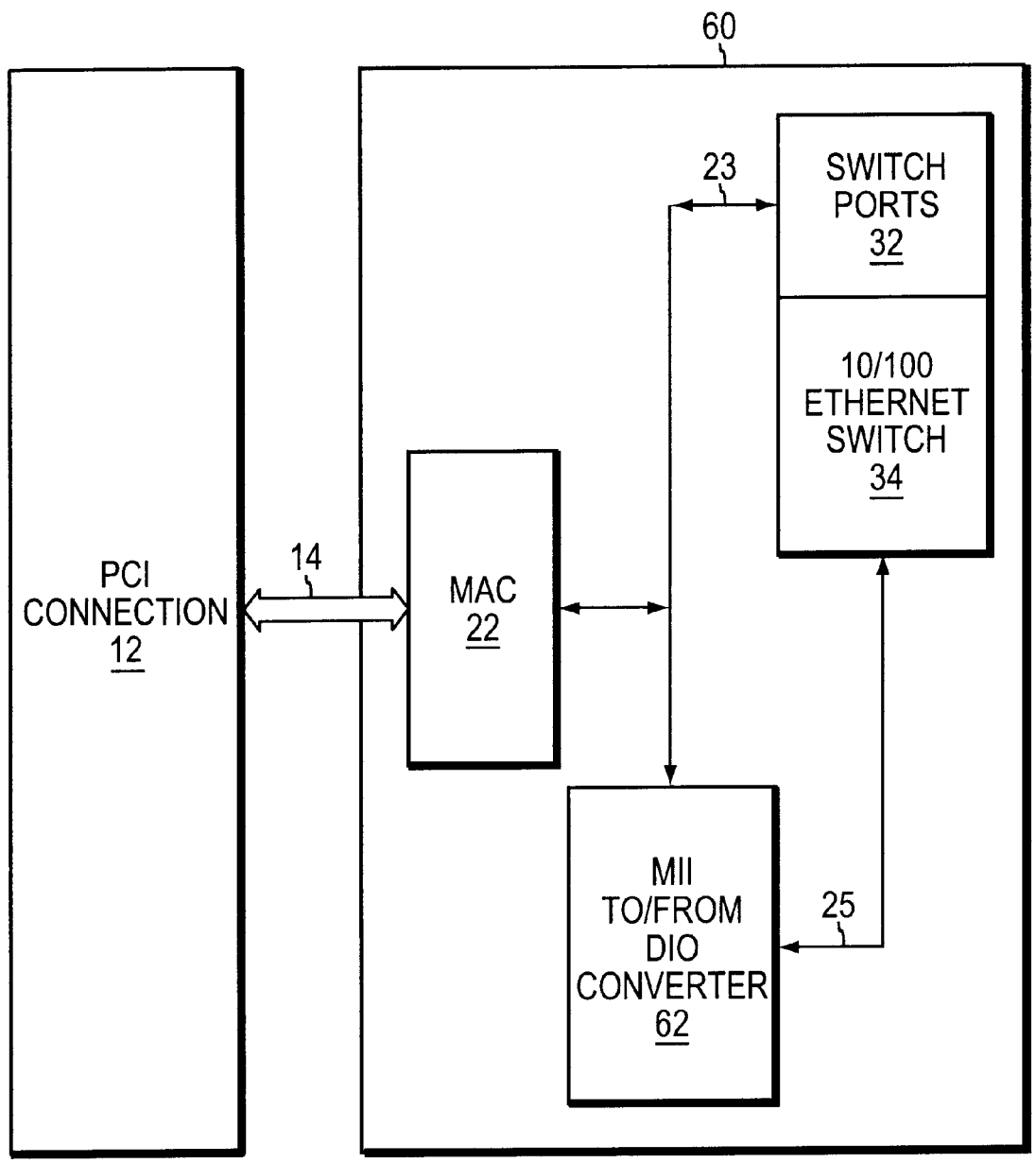
FIG. 4 is a block diagram of a switch embodiment of the present invention.

FIG. 4 illustrates a second example of an embodiment of the present invention where a single adapter provides an Ethernet switch 60. As seen in FIG. 4, the switch ports 32 may communicate with the MAC 22 over the MII bus 23 and, thus, communicate with the PCI bus 14. Thus, an internal connection is provided from the MAC to the switch port 32 for normal traffic. Control of the switch ports 32 is provided by the 10/100 Ethernet Switch 34 which communicates using the bus 25 where bus 25 is a bus other than the MII bus. For example, in a Texas Instruments device, the bus 25 is an 8 bus referred to as a data in/data out (DIO) bus. According to the present invention, this second control function of the adapter card 60 is provided through the MII bus 23 by providing a converter 62 which converts from the MII bus 23 to the bus 25 to provide control information to and receive status information from the control function 34 of the switch. Such a conversion function may be provided, for example, through a field programmable gate array.

In any event, the control function 34 may be accessed through the MAC 22 by assigning an unused address of the MII bus to the converter 62, and thereby, indirectly to the control function 34, such that management communications to that assigned addressed are routed from the MII bus 23 to the bus 25 and to the control function 34. As discussed above, these management function communications may have the data re-mapped in them to the data needed by the control function 34 so as to facilitate the control of the switch adapter 60.

Figure 5:
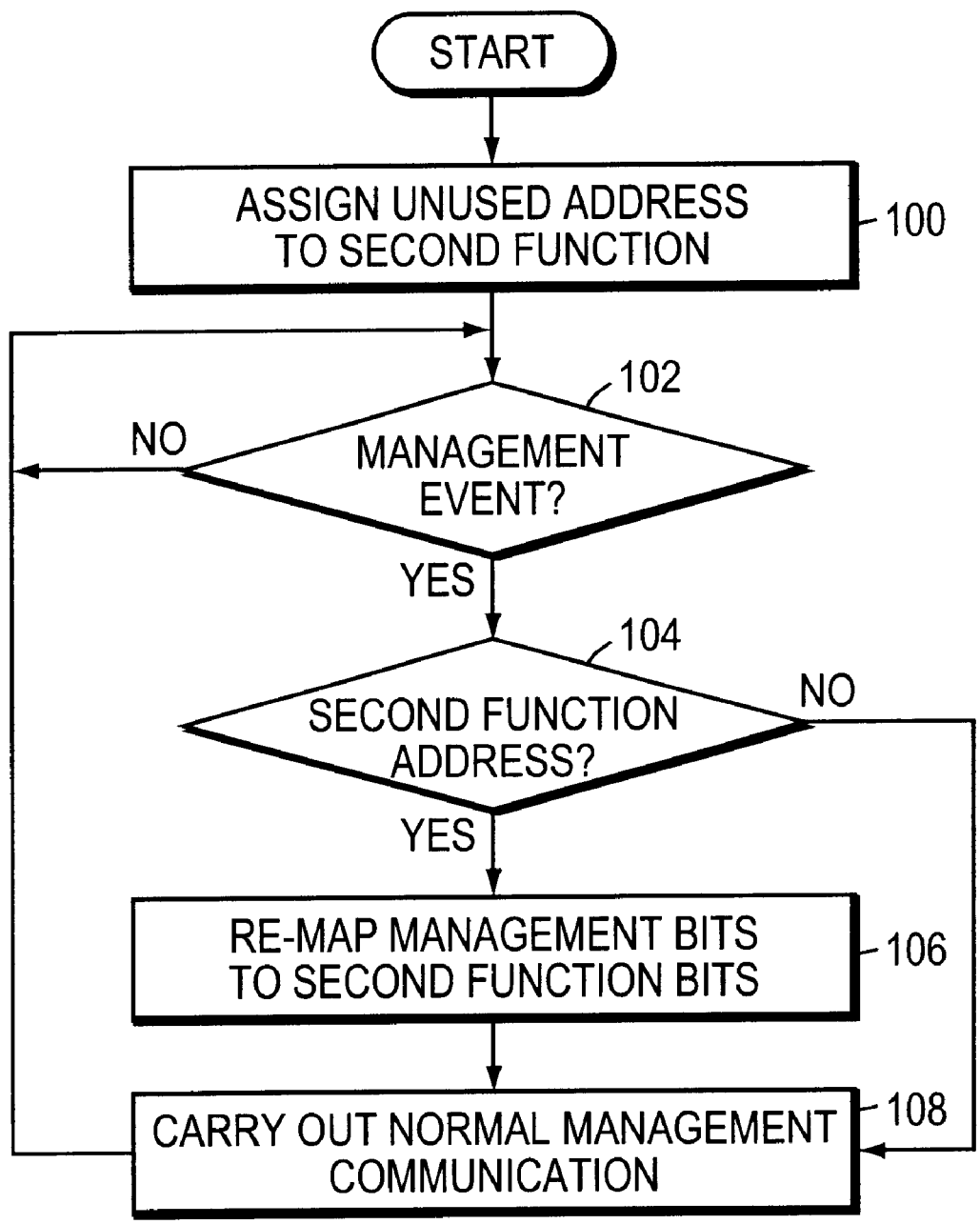
FIG. 5 is a flowchart illustrating operations according to the present invention.

Operations for various aspects of one embodiment of the present invention are illustrated in detail in FIG. 5 which is a flowchart illustration. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As seen in FIG. 5, an address which is not used by a primary function (such as the PHY 24 of FIG. 3) (i.e., an unused address) is assigned to the secondary function (for example, the non-PHY function 52 of FIG. 3) (block 100). Then when a management event occurs, either a read or a write operation (block 102) it is determined if the management event is to the secondary function address (block 104). If the address of the management event is not to the secondary function address (block 104) then the normal management functions are carried out (block 108). However, if the address corresponds to the secondary function address then the bits of the management data are re-mapped to the secondary function specific bits (block 106). This re-mapping of bits may occur whether the management function is a read or a write. Thus, for a write operation, the data of the management write function would be set to the secondary function specific data. For a read operation, the data would be used or analyzed based on the secondary function data definition. The management function is then completed (block 108) utilizing these re-mapped bits.

Thus, the present invention provides for the inclusion of functions other than those functions for which an industry standard interface is configured without requiring a separate access point for the additional functions, a separate bus structure or disruption of the industry standard interface. Such is accomplished by utilizing otherwise unused resources of the interface and then tailoring those resources to the non-standard function without impacting operations of the standard functions. While the present invention has been described with respect to an Ethernet adapter, the PCI bus and the MII bus, as will be appreciated by those of skill in the art in light of the present disclosure, the present invention may be applicable to other situations where an industry standard interface is utilized. For example, the present invention may be utilized in a system implementing the UTOPIA interface and ATM PHYs. Accordingly, the present invention should not be construed as limited to the examples provided herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of communicating to multiple functions on a single adapter device over an external communications bus, wherein the external communications bus is configured so as to allow only a single access point to the external communications bus for each adapter device, the method comprising:

providing communications on the external communications bus through the single access point to functions of a first type in the adapter device utilizing a function specific communications interface configured for communicating with functions of the first type; and providing communications on the external communications bus through the single access point to functions in the adapter device other than functions of the first type utilizing management capabilities of the function specific communications interface so as to provide communications with the functions of the second type without requiring modification of the configuration of the function specific communications interface.

2. A method according to claim 1, further comprising the steps of assigning to the functions in the adapter device other than functions of the first type an unused address of the function specific communications interface.

3. A method according to claim 2, wherein the step of providing communications on the external communications bus through the single access point to functions in the adapter device other than functions of the first type comprises providing management function communications to the unused address assigned to the other than the function of the first type.

4. A method according to claim 1, further comprising the step of re-mapping data associated with management function communications with the functions other than the functions of the first type so as to provide function specific communications with the functions other than the function of the first type.

5. A method according to claim 1, wherein the single access point comprises a Peripheral Component Interconnect (PCI) media access controller.

6. A method according to claim 5, wherein the function specific communications interface comprises an Ethernet media independent interface (MII).

7. A method according to claim 6, wherein the functions of a first type comprises physical interfaces (PHYs).

8. A method according to claim 7, wherein the functions in the adapter device other than functions of the first type comprises a hardware address filter function.

9. A method according to claim 6, wherein the functions of a first type comprises an Ethernet switch, wherein ports of the Ethernet switch communicate over the MII and wherein control of the Ethernet switch is provided over a bus other than the MII bus.

10. A method according to claim 9, wherein the functions in the adapter device other than functions of the first type comprises functions for converting communications on the bus other than the MII bus to MII communications so as to allow control of the Ethernet switch from the PCI bus through the MAC.

11. A system for communicating to multiple functions on a single adapter device over an external communications bus, wherein the external communications bus is configured so as to allow only a single access point to the external communications bus for each adapter device, comprising:

means for providing communications on the external communications bus through the single access point to functions of a first type in the adapter device utilizing a function specific communications interface configured for communicating with functions of the first type; and means for providing communications on the external communications bus through the single access point to functions in the adapter device other than functions of the first type utilizing management capabilities of the function specific communications interface so as to provide communications with the functions of the second type without modifying the configuration of the function specific communications interface.

12. A system according to claim 11, further comprising means for assigning to the functions in the adapter device other than functions of the first type an unused address of the function specific communications interface.

13. A system according to claim 12, wherein the means for providing communications on the external communications bus through the single access point to functions in the adapter device other than functions of the first type comprises means for providing management function communications to the unused address assigned to functions other than the first type.

14. A system according to claim 11, further comprising means for re-mapping data associated with management function communications with the functions other than the functions of the first type so as to provide function specific communications with the functions other than the function of the first type.

15. A system according to claim 11, wherein the single access point comprises a Peripheral Component Interconnect (PCI) media access controller.

16. A system according to claim 15, wherein the function specific communications interface comprises an Ethernet media independent interface (MII).

17. A system according to claim 16, wherein the functions of a first type comprise physical interfaces (PHYs).

18. A system according to claim 17, wherein the functions in the adapter device other than functions of the first type comprises a hardware address filter function.

19. A system according to claim 16, wherein the functions of a first type comprises an Ethernet switch, wherein ports of the Ethernet switch communicate over the MII and wherein control of the Ethernet switch is provided over a bus other than the MII bus.

20. A system according to claim 19, wherein the functions in the adapter device other than functions of the first type comprises functions for converting communications on the bus other than the MII bus to MII communications so as to allow control of the Ethernet switch from the PCI bus through the MAC.

21. A multi-function adapter device comprising:
   a controller which provides a single access point to an external communications bus;
   at least one function of a first type;
   an internal function specific communications interface, the interface configured to provided communication between functions of the first type and the external communications bus through the controller; and
   at least one function of a second type, each function of the second type configured to utilize management capabilities of the function specific communications interface so as to provide communications without requiring modification of the function specific communications interface.

22. A multi-function adapter device according to claim 21, wherein data portions of the management functions of the function specific communications interface are re-mapped to correspond to the function of the second type.

23. A multi-function adapter device according to claim 21, wherein each function of the second type is assigned an unused address of the function specific communications interface.

24. A multi-function adapter device according to claim 21, wherein the controller comprises a media access controller (MAC).

25. A multi-function adapter device according to claim 21, wherein the controller comprises a Peripheral Component Interconnect (PCI) contoller.

26. A multi-function adapter device according to claim 21, wherein the internal function specific communications interface comprises an Ethernet media independent interface (MII).

27. A multi-function adapter device according to claim 26, wherein the function of the first type comprises an Ethernet switch, wherein ports of the Ethernet switch communicate over the MII and wherein control of the Ethernet switch is provided over a bus other than the MII bus.

28. A multi-function adapter device according to claim 27, wherein the function of the second type comprises an adapter for converting communications on the bus other than the MII but to MII communications so as to allow control of the Ethernet switch through the access controller.

29. A multi-function adapter device according to claim 21, wherein the function of the second type comprises a hardware address filter.

30. A multi-function adapter device according to claim 21, wherein the function of the first type comprises a network physical interface (PHY).

31. A computer readable media, comprising: the computer readable media containing instruction for execution in a processor for the practice of the method of claim 1.

32. Electromagnetic signals propagating on a computer network, comprising: the electromagnetic signals carrying instructions for execution on a processor for the practice of the method of claim 1.

* * * * *

UNITED STATES PATENT AND TRADEMARK OFFICE
CERTIFICATE OF CORRECTION

PATENT NO. : 6,408,347 B1
DATED : June 18, 2002
INVENTOR(S) : David John Smith et al.

It is certified that error appears in the above-identified patent and that said Letters Patent is hereby corrected as shown below:

<u>Title page, Item [54] and Column 1, line 1,</u>
Delete title "INTEGRATED MULTI-FUNCTION ADAPTERS USING STANDARD INTERFACES THROUGH SINGLE A ACCESS POINT"
and substitute therefore -- INTEGRATED MULTI-FUNCTION ADAPTERS USING STANDARD INTERFACES THROUGH A SINGLE ACCESS POINT --

Signed and Sealed this

Third Day of September, 2002

*Attest:*

*Attesting Officer*

JAMES E. ROGAN
*Director of the United States Patent and Trademark Office*